(12) United States Patent
Funane

(10) Patent No.: US 10,458,786 B2
(45) Date of Patent: Oct. 29, 2019

(54) METHOD FOR COUNTING CORDS IN RUBBER SHEET

(71) Applicant: Sumitomo Rubber Industries, Ltd., Kobe-shi, Hyogo (JP)

(72) Inventor: Junki Funane, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/769,499

(22) PCT Filed: Oct. 24, 2016

(86) PCT No.: PCT/JP2016/081438
§ 371 (c)(1),
(2) Date: Apr. 19, 2018

(87) PCT Pub. No.: WO2017/082030
PCT Pub. Date: May 18, 2017

(65) Prior Publication Data
US 2018/0306576 A1   Oct. 25, 2018

(30) Foreign Application Priority Data

Nov. 11, 2015 (JP) .................... 2015-221080

(51) Int. Cl.
*G01B 11/25* (2006.01)
*B29D 30/38* (2006.01)
*G06M 1/27* (2006.01)

(52) U.S. Cl.
CPC .......... *G01B 11/2522* (2013.01); *B29D 30/38* (2013.01); *G06M 1/27* (2013.01); *B29D 2030/381* (2013.01)

(58) Field of Classification Search
CPC . G01B 11/2522; G01B 11/2518; G01B 11/24; G01B 11/002; G01B 11/046;
(Continued)

(56) References Cited

U.S. PATENT DOCUMENTS 3,360,636 A * 12/1967 Ramsay ............ G01N 30/8606
377/1
3,721,809 A * 3/1973 Strandberg, Jr. ....... G01N 33/36
242/534
(Continued)

FOREIGN PATENT DOCUMENTS

EP    2990168 A1    3/2016
JP    2007-48091 A   2/2007
(Continued)

OTHER PUBLICATIONS

International Search Report for PCT/JP2016/081438 dated Jan. 24, 2017.
(Continued)

*Primary Examiner* — Mohamed K Amara
(74) *Attorney, Agent, or Firm* — Birch, Stewart, Kolasch & Birch, LLP

(57) ABSTRACT

A method of counting cords embedded in a rubber sheet including a step of acquiring raw waveform data by scanning the outer surface of the rubber sheet, a step of obtaining first corrected data by performing a moving average processing on the raw waveform data, a step of obtaining second corrected data D3 by converting the amplitude center j of the waveform of the first corrected data into a straight line, a step of obtaining concave-center-position data, a step of obtaining first corrected concave-center-position data, and a step of obtaining second corrected concave-center-position data.

4 Claims, 8 Drawing Sheets

(58) Field of Classification Search
CPC ........ G01B 15/04; G06M 1/27; G06M 1/272; G06M 1/274; G06M 1/102; G06M 1/10; B29D 30/38; B29D 2030/381; B29D 2030/386
See application file for complete search history.

(56) References Cited

U.S. PATENT DOCUMENTS

| | | | |
|---|---|---|---|
| RE27,869 E * | 1/1974 | Willits | G06M 1/101 235/98 C |
| 9,234,746 B2 * | 1/2016 | Inoue | B29D 30/3007 |
| 2002/0097400 A1 * | 7/2002 | Jung | A61B 5/0075 356/419 |
| 2003/0038938 A1 * | 2/2003 | Jung | G01J 3/02 356/419 |
| 2016/0089806 A1 * | 3/2016 | Takeuchi | B29D 30/46 83/365 |

FOREIGN PATENT DOCUMENTS

| | | | | | |
|---|---|---|---|---|---|
| JP | 2011-115992 A | | 6/2011 | | |
| JP | 2012-106332 A | | 6/2012 | | |
| JP | 2012-131111 A | | 7/2012 | | |
| JP | 2013049109 A | * | 3/2013 | ............. | B29D 30/46 |
| JP | 2015-24518 A | | 2/2015 | | |

OTHER PUBLICATIONS

Extended European Search Report, dated May 3, 2019, for European Application No. 16863994.6.

* cited by examiner (A)

(B)

METHOD FOR COUNTING CORDS IN RUBBER SHEET

TECHNICAL FIELD

The present invention relates to a method for counting cords in a rubber sheet which can count easily and accurately the number of cords embedded within a rubber sheet.

BACKGROUND ART

As to pneumatic tires, there have been known those having a structure in which a band layer is disposed outside a belt layer. For example, as shown in FIG. 8 (A), a band layer is formed by winding a narrow strip ply 4 spirally in the tire circumferential direction. The narrow strip ply 4 comprises a plurality of cords 3 embedded in rubber (g) at intervals.

On the other hand, as shown in FIG. 8 (B), the narrow strip ply 4 is formed by dividing a wide ply material (a) with a plurality of cutters (b). Typically, a primary ply material a1 which is a top fabric of about 1450 mm width is once cut and divided into secondary ply materials a2 of about 100 mm width. Thereafter, the secondary ply material a2 is further cut and divided into narrow strip plies 4 of about 10 mm width.

At this time, each narrow strip ply 4 is required to have a specified number of cords 3. Therefore, conventionally, the cords embedded in the primary and secondary ply materials a1, a2 are counted by visual observation. And, marking is made at each of positions corresponding to every specified cord number, and then, cutters (b) for dividing are set at the respective positions of the markings (for example, see Patent Document 1).

However, the counting of the cords by visual observation is poor in the working efficiency. Further, the incidence of erroneous counting becomes higher, and the accuracy and reliability are deteriorated.

PRIOR ART DOCUMENT

Patent Document

Patent Document 1: Japanese Patent Application Publication No. 2012-131111

SUMMARY OF THE INVENTION

Problems to be Solved by the Invention

In the present invention, therefore, a problem is to provide a method for counting cords in a rubber sheet, by which cords embedded in a rubber sheet can be counted with good working efficiency while improving the reliability and accuracy, by basically applying a specific correction processing to raw waveform data on convexoconcave of an outer surface obtained through scanning by a displacement sensor.

Means for Solving the Problems

The present invention is a cord counting method for counting the number of cords from one end in a widthwise direction of a rubber sheet in which a number (n) of the cords are embedded at intervals, and in an outer surface of the rubber sheet, convex portions at which the cords are located and concave portions positioned between the cords are alternately repeated, the above-said cord counting method characterized by comprising 1) a step (S1) in which, by the use of a displacement sensor, the outer surface of the rubber sheet is scanned in the widthwise direction, and raw waveform data on convexoconcave of the outer surface is acquired, 2) a step (S2) in which a moving average processing is carried out on the raw waveform data so as to reduce noise, and first corrected data on the smoothed waveform is obtained, 3) a step (S3) in which second corrected data is obtained from the first corrected data of which amplitude center is converted into a straight line, 4) a step (S4) in which widthwise-direction concave-center-position data is obtained wherein concave-center-positions in the widthwise direction between the cords are defined by positions of lowest points of valleys of the waveform of the second corrected data, 5) a step (S5) in which, with respect to the above-said concave-center-position data, intervals K between the concave-center-positions adjacent in the widthwise direction are compared with a predetermined upper threshold K max, and if K>K max, then a concave-center-position for correction is added at the midpoint of the interval K, and the above-said intervals K are compared with a predetermined lower threshold K min, and if K<K min, then from the concave-center-positions on both sides of the interval K, the concave-center-position on the front side in the scanning direction is removed, whereby first corrected concave-center-position data is obtained, 6) a step (S6) in which, with respect to the first corrected concave-center-position data, the total number (m) of the concave-center-positions is compared with the above-said number (n) in the order from the largest interval, and when m<(n−1), a concave-center-position for correction is added at the midpoint of the interval K, until becoming m=(n−1), when m>(n−1), from the concave-center-positions on both sides of the interval K, the concave-center-position on the front side in the scanning direction is deleted in the order from the smallest interval K, until becoming m=(n−1), whereby second corrected concave-center-position data is obtained, 7) the count from one end in the widthwise direction, of the concave-center-positions in the above-said second corrected concave-center-position data is considered as the number of the cords from the above-said one end in the widthwise direction.

In the cord counting method according to the present invention, it is preferable for the step (S2) to carry out the moving average processing in a range of 20-30% of the average pitch distance of the above-said cords.

In the cord counting method according to the present invention, it is preferable for the step (S5) that the upper threshold K max is in a range of 120-150% of the average pitch distance, and the lower threshold K min is in a range of 50-80% of the average pitch distance.

Effect of the Invention

Because the present invention is constituted as described above, the cords embedded in the rubber sheet can be counted with good working efficiency, while improving the reliability and accuracy.

MODE FOR CARRYING OUT THE INVENTION

Hereinafter, embodiments of the present invention will be described in detail.

Figure 1:
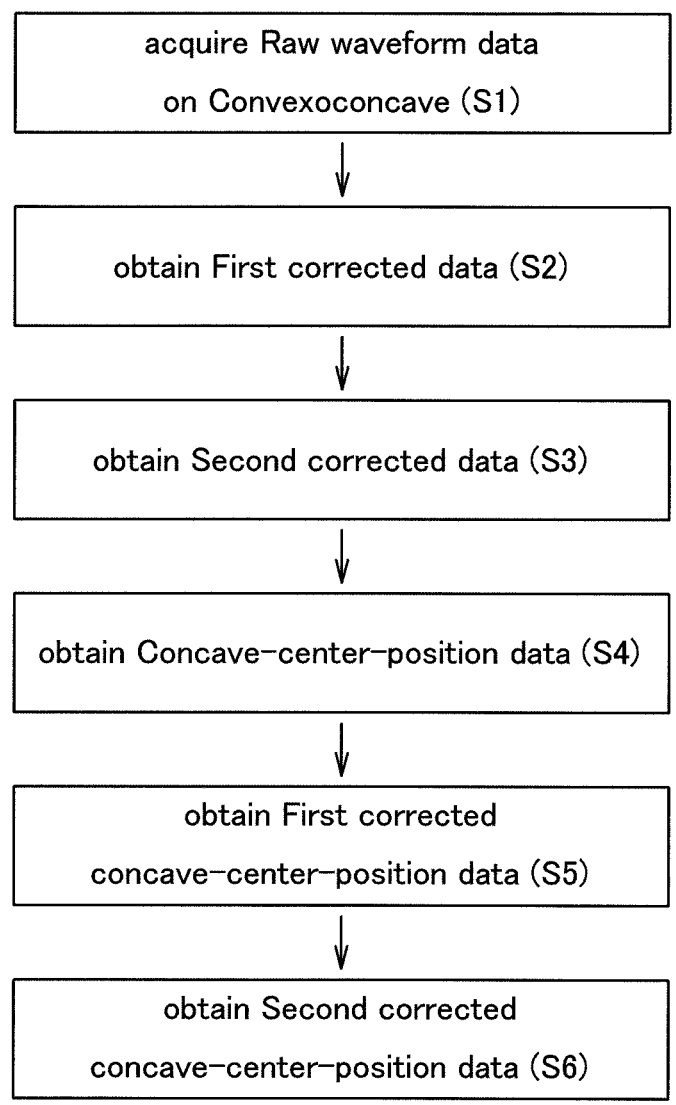
FIG. 1 A flowchart illustrating a method for counting cords in a rubber sheet according to the present invention.

As shown in FIG. 1, a method for counting cords in a rubber sheet of the present embodiment (hereinafter referred to as "cord counting method") has
a step S1 of acquiring raw waveform data D1,
a step S2 of obtaining first corrected data D2,
a step S3 of obtaining second corrected data D3,
a step S4 of obtaining concave-center-position data D4,
a step S5 of obtaining first corrected concave-center-position data D5, and
a step S6 of obtaining second corrected concave-center-position data D6. And, the cords 3 embedded in the rubber sheet 2 are counted from one end E1 in the widthwise direction of the rubber sheet 2.

Figure 8:
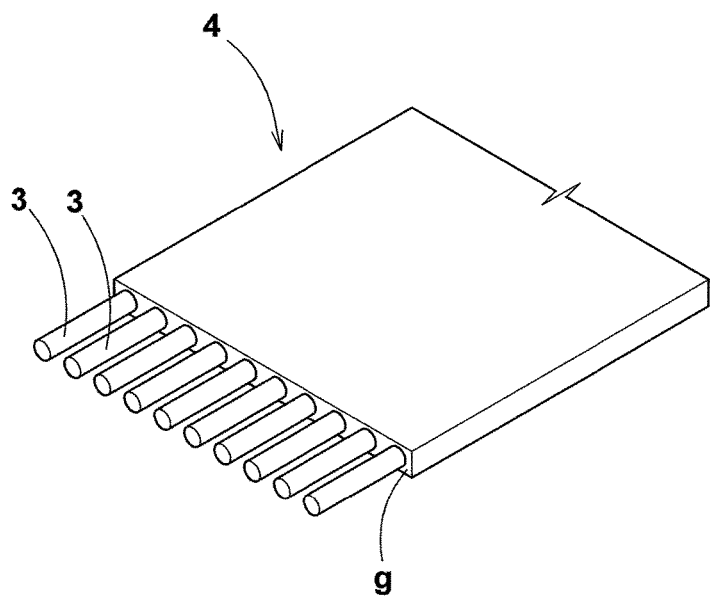
FIG. 8 (A), (B) are conceptual diagrams for explaining a method of forming narrow strip plies for forming a band layer of a pneumatic tire.
Figure 8:
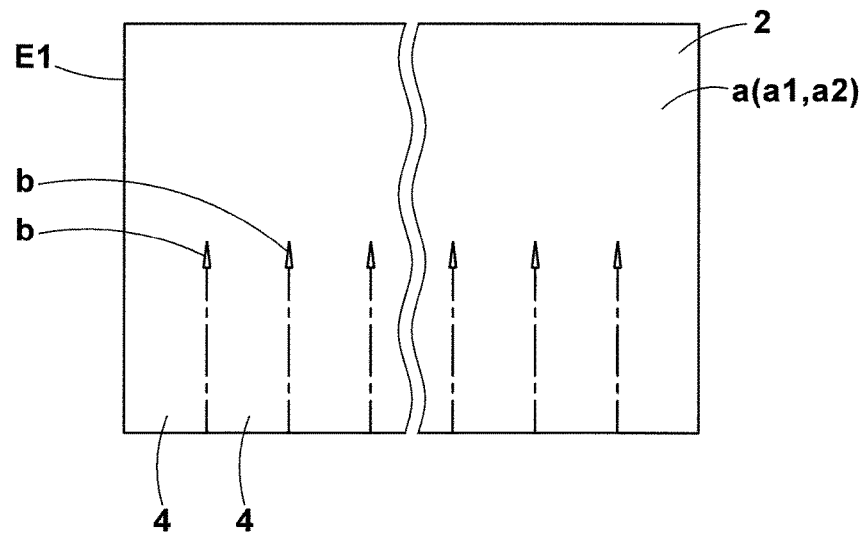

In this example, the cord counting method is used to cut and divide the rubber sheet 2 which is a ply material (a) as shown in FIG. 8, into the narrow strip plies 4 for forming a band layer of a pneumatic tire.
specifically, by counting the cords 3 in the rubber sheet 2 from one end E1, a marking is made at every cut-dividing position at which the cord count becomes a specified number.

Then, by arranging cutters at the respective marked positions, the rubber sheet 2 is cut into a plurality of narrow strip plies 4 having the same cords count (specified number).

Figure 2:
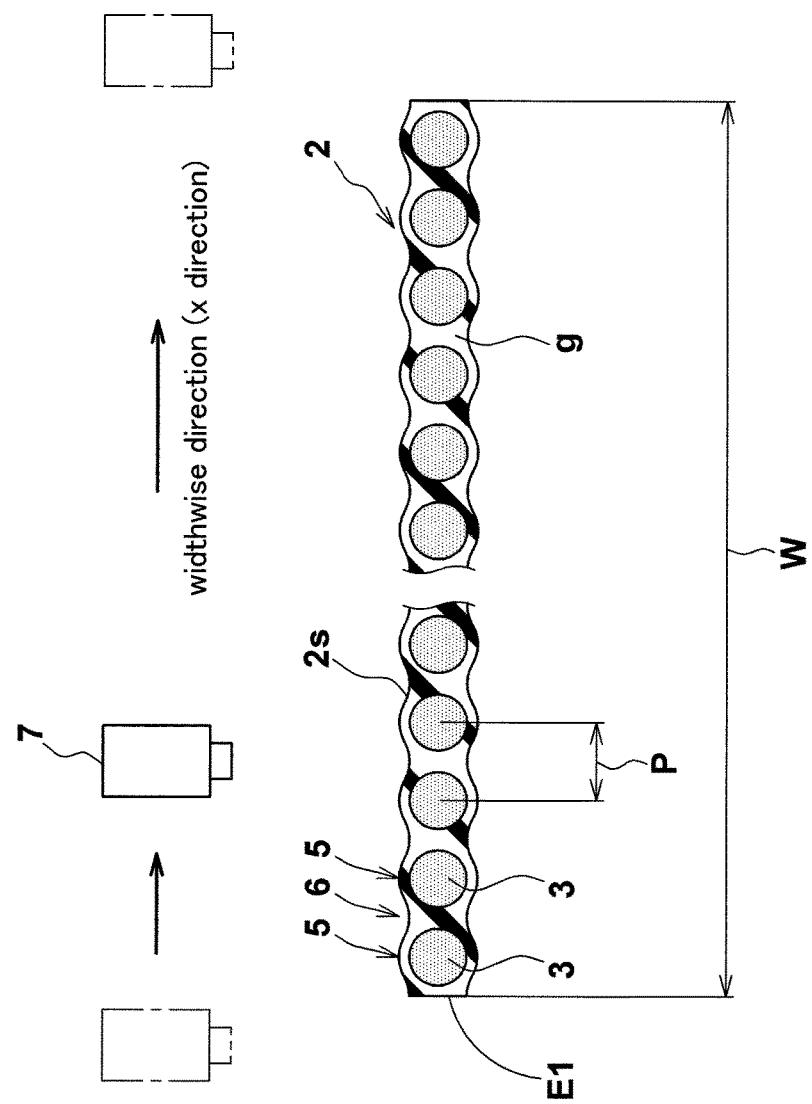
FIG. 2 A sectional view conceptually showing convexo-concave of the outer surface of the rubber sheet together with a raw waveform acquiring step.

As shown in FIG. 2, the rubber sheet 2 comprises a number (n) of cords 3 embedded in rubber (g). The cords 3 are arranged at intervals in the widthwise direction of the rubber sheet 2. An outer surface 2s of the rubber sheet 2 is formed as an uneven surface formed by alternation of convex portions 5 at which the cords 3 are located, and concave portions 6 positioned between the cords 3, 3.

Figure 3:
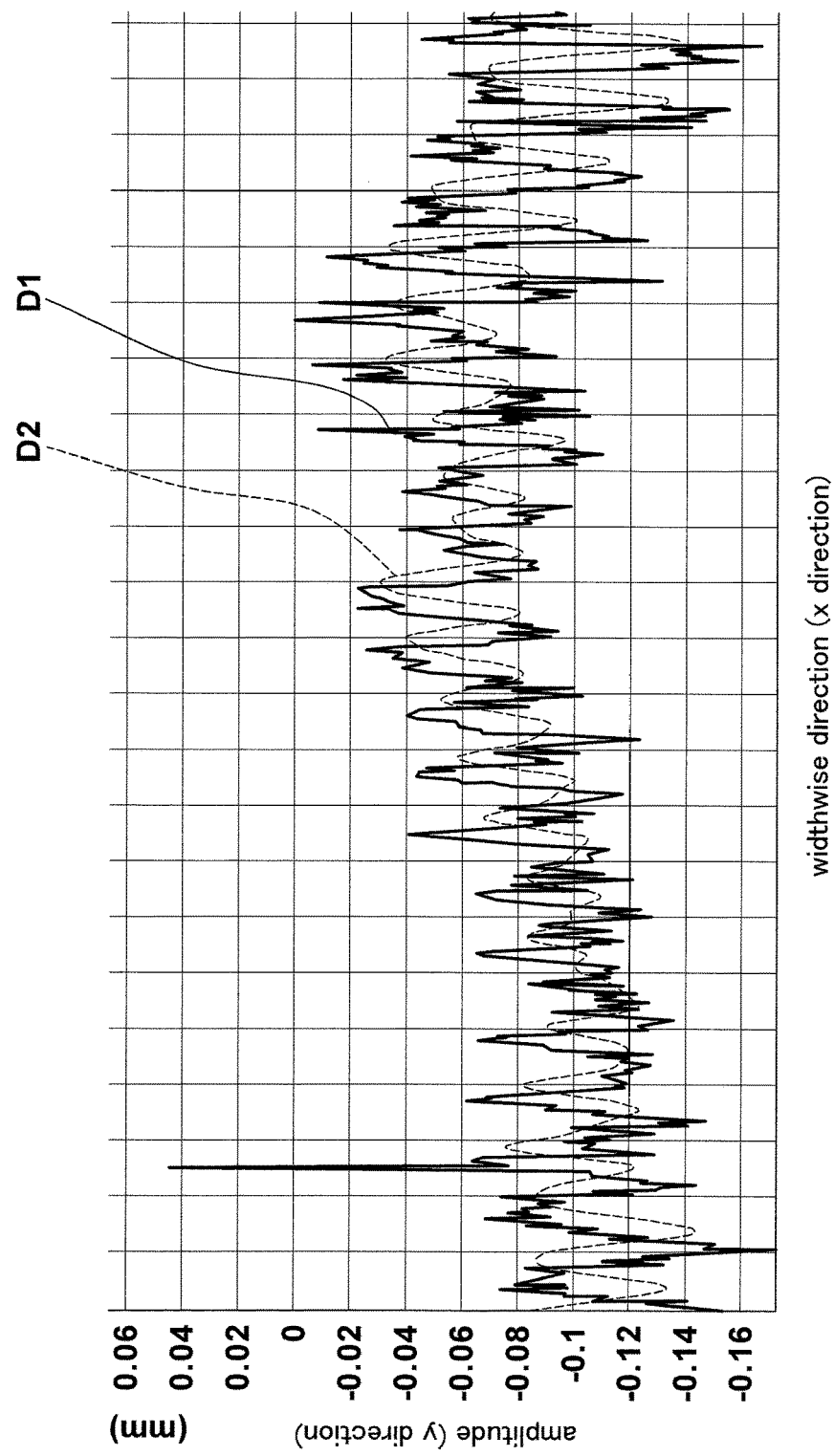
FIG. 3 A graph illustrating the raw waveform data and first corrected data obtained therefrom.

In the step S1, by the use of a displacement sensor 7, the outer surface 2s of the rubber sheet 2 is scanned in the widthwise direction (x-direction).
Thereby, raw waveform data D1 (shown in FIG. 3 by a solid line) on the convexoconcave of the outer surface 2s is obtained. As to the displacement sensor 7, those of non-contact type such as a laser displacement gauge is preferably employed.

In the step S2, the raw waveform data D1 is corrected through moving average processing. Thereby, the first corrected data D2 (shown in FIG. 3 by a broken line) on a smooth waveform from which noise has been reduced, is obtained.

In the moving average processing, it is preferable to perform a moving average in a range of 20 to 30% of the average pitch distance P (shown in FIG. 2) of the cords 3.
If less than 20%, it becomes difficult to reduce the noise sufficiently. If more than 30%, it becomes difficult to accurately locate positions of peaks of the convexoconcave.

In order to make the waveform clearer, it is preferred to perform the moving average multiple times, for example, 10 to 20 times.

The average pitch distance P is a mean value of the distances between the cords 3, 3, and is given by the following formula (1) using the width w of the rubber sheet 2 and the number (n) of the cords:

$$P = W/n \quad (1).$$

Figure 4:
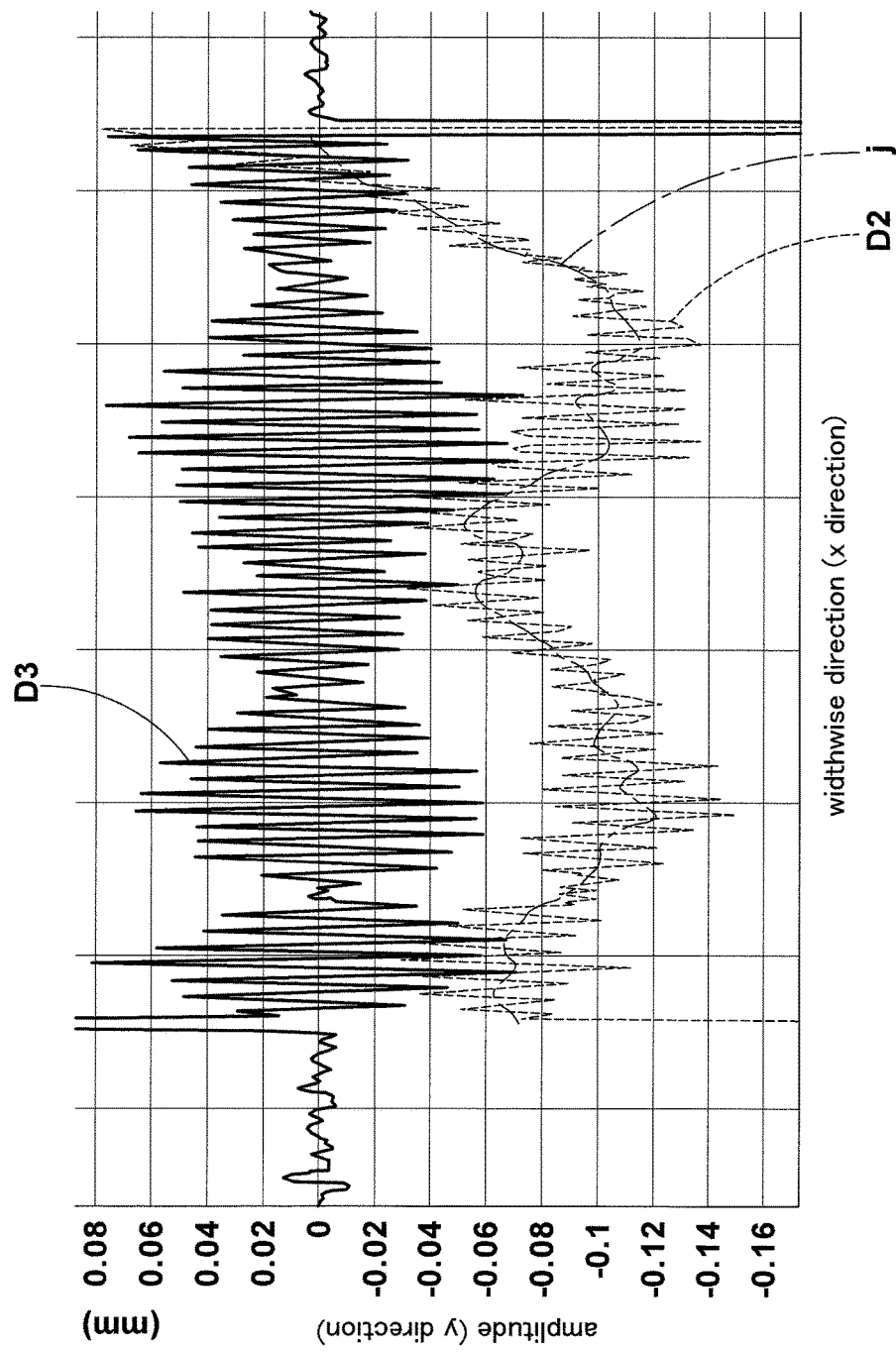
FIG. 4 A graph illustrating the first corrected data and second corrected data obtained therefrom.

In the step S3, the second corrected data D3 is obtained as shown in FIG. 4. The second corrected data D3 is data converted so that the amplitude center j of the waveform of the first corrected data D2 becomes a straight line.
In the figure, the amplitude of the second corrected data D3 is depicted in an enlarged manner.

Figure 7:
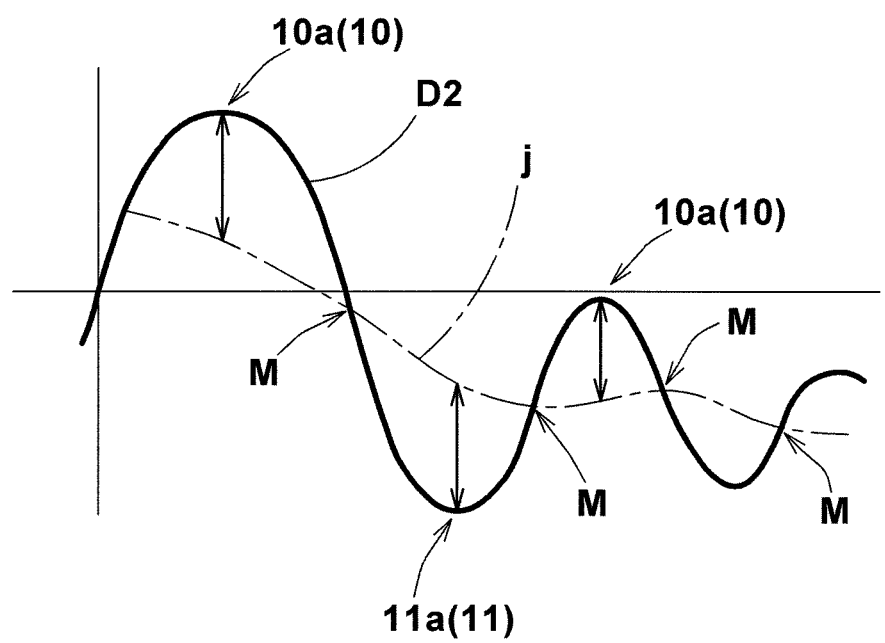
FIG. 7 A conceptual diagram illustrating a method of creating second corrected data.
Figure 7:
Figure 7:
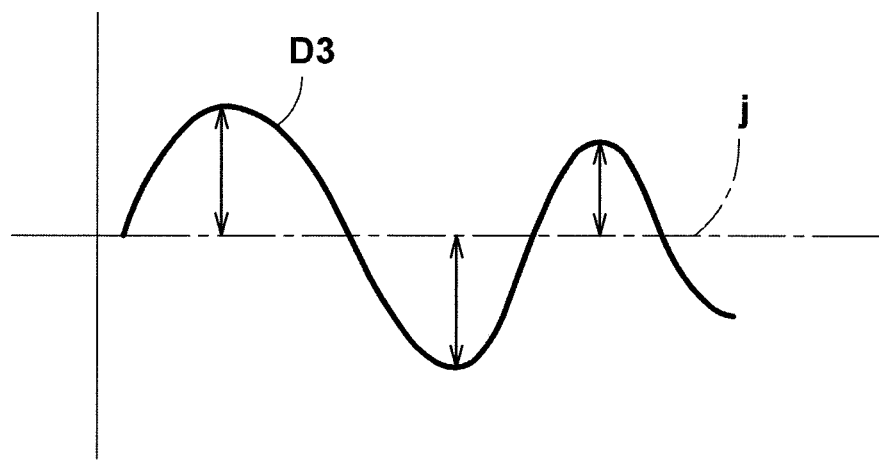

In particular, as shown conceptually in FIG. 7, "M" denotes midpoints in y-direction between apexes 10a of mountains 10 and apexes 11a of valleys 11 adjacent in the widthwise direction (x direction) in the waveform of the first corrected data D2.

The amplitude center j is a curve passing through each midpoint M, and it can be obtained by regression analysis of the respective midpoints M.
Then, by replacing the amplitude center j by a straight line in the widthwise direction (x-direction), the waveform of the second corrected data D3 is obtained.

Figure 5:
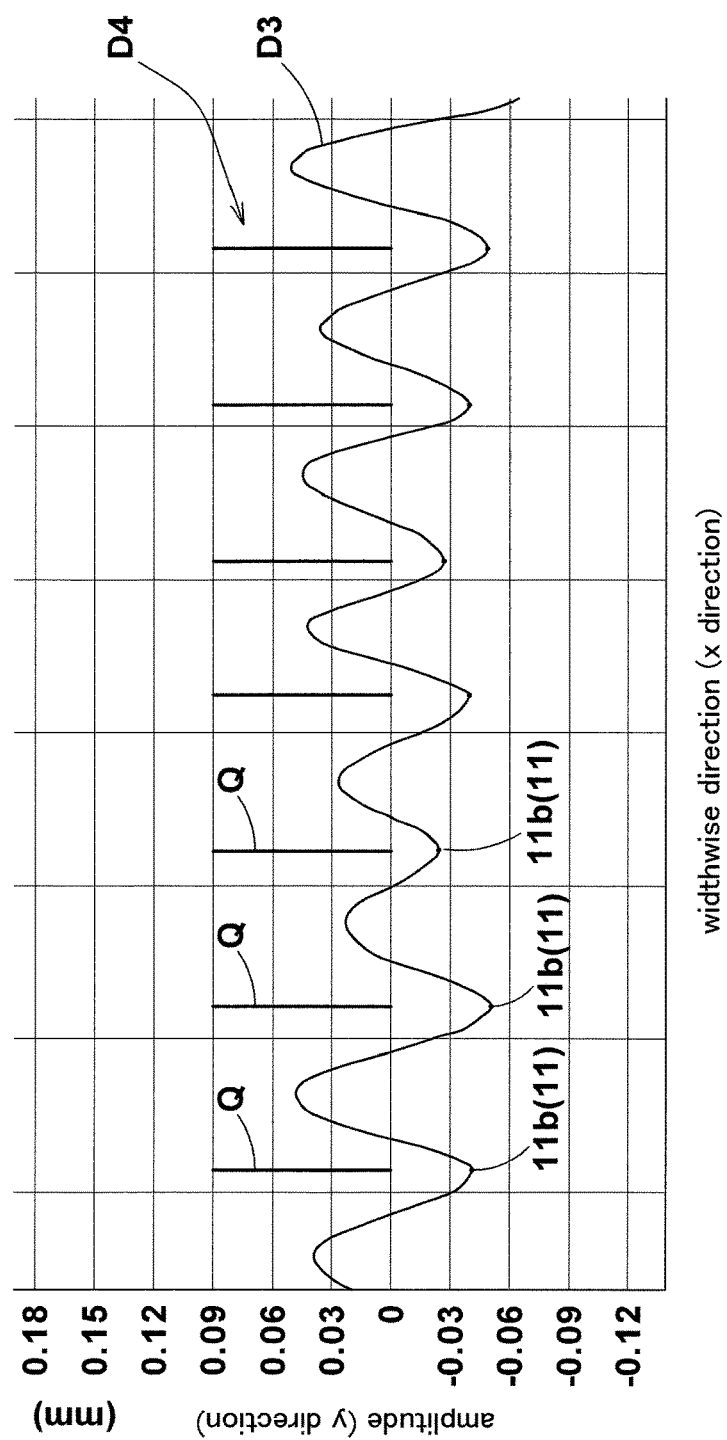
FIG. 5 A graph illustrating the second corrected data and concave-center-position data obtained therefrom.

In the step S4, widthwise-direction concave-center-position data D4 is obtained as shown in FIG. 5.
The concave-center-position data D4 is data on the positions Q in the widthwise direction (x-direction) of the centers of the concave portions 6, which correspond to data on the positions in the widthwise direction (x-direction) of the centers between the cords 3, 3.

In particular, used as the concave-center-position data D4 is data on the positions in the widthwise direction (x direction) of the lowest points 11b (corresponding to the apexes 11a) of the respective valleys 11 in the waveform of the second correction data D3.

Figure 6:
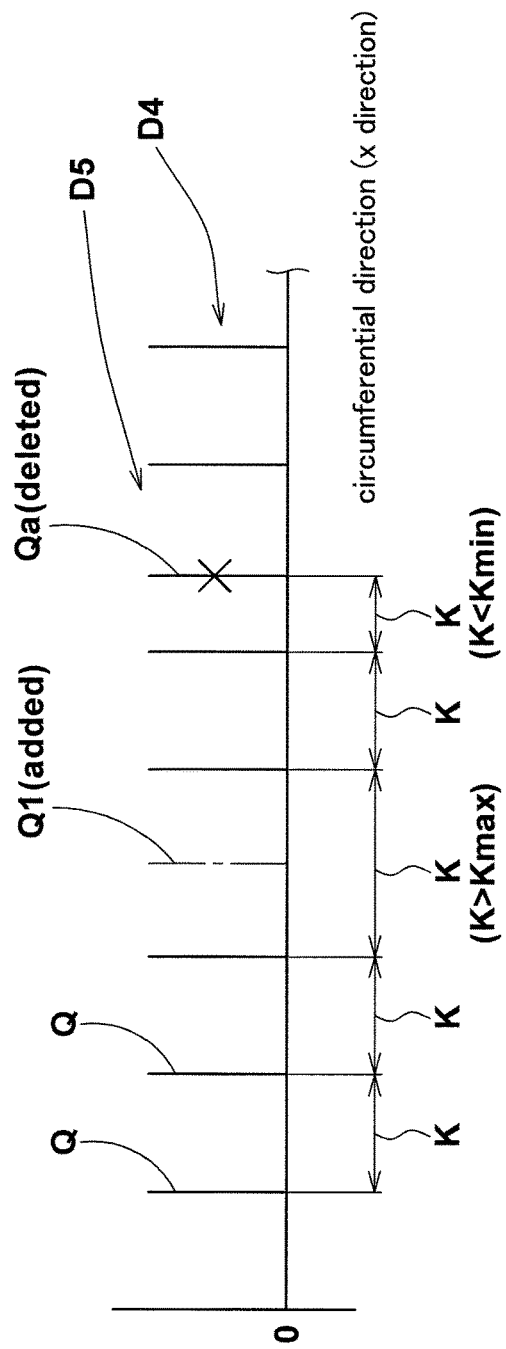
FIG. 6 A conceptual diagram illustrating a first concave-center-position correction step.

In the step S5, as shown in FIG. 6, with respect to the concave-center-position data D4, intervals K between the concave-center-positions Q, Q adjacent in the widthwise direction (x-direction) are compared with a predetermined upper threshold K max and lower threshold K min so as to add/delete concave-center-positions Q.

Specifically, with respect to the concave-center-position data D4, the intervals K and the upper threshold K max are sequentially compared. Then, if K>K max, a concave-center-position Q1 for correction is added at the midpoint of the interval K.

Further, with respect to the concave-center-position data D4, the intervals K and the lower threshold K min are sequentially compared. Then, if K<K min, among the concave-center-positions Q, Q on both sides of the concerned interval K, the concave-center-position Qa on the front side in the scan direction is deleted.

Thereby, the first corrected concave-center-position data D5 in which the addition and deletion of the concave-center-positions Q have been made, is obtained.

Thus, by comparing the interval K with the upper threshold K max and lower threshold K min, the intervals K which are likely error data are detected. By adding and deleting the concave-center-positions Q with respect to the interval K, it is possible to make closer to the correct data.

It is preferable that the upper threshold K max is in a range of 120 to 150% of the average pitch distance P, and the lower threshold K min is in a range of 50 to 80% of the average pitch distance P.

If the upper threshold K max and lower threshold K min are out of the above-mentioned ranges, it leads to a decrease in the detection accuracy of error data.

In the step S5, due to the addition and deletion of the concave-center-positions Q, there is a possibility that the total number (m) of the concave-center-positions Q becomes different from the number of the actual concave portions 6. Therefore, the step S6 is performed.

In the step S6, addition/deletion is made on the concave-center-positions Q by comparing the total number (m) of the concave-center-positions Q in the first corrected concave-center-position data D5 with the number (n).

More specifically, if m<(n−1), then in the first corrected concave-center-position data D5, in the order from the largest interval K, a concave-center-position Q1 for correction is added at the midpoint of the interval K until becoming m=(n−1).

If m>(n−1), then in the first corrected concave-center-position data D5, in order from the smallest interval K, a concave-center-position Qa on the front side in the scanning direction, of the recess center positions on both sides of the concerned interval K, is removed until becoming m=(n−1).

It is therefore, possible to obtain second corrected concave-center-position data D6 (not shown) which is further closer to the correct data.

Further, the number of counts of the concave-center-positions Q in the second corrected concave-center-position data D6, can be regarded as the number of counts of the cords 3 in the rubber sheet 2.

Further, it becomes possible to accurately mark out the cords 3 every specified number from one end E1 in the widthwise direction based on the second corrected concave-center-position data D6.

Since the distance of each of the concave-center-positions Q from the end E1 in the widthwise direction is determined based on the raw waveform data D1 originated from the scanning, the marked-out positions are also determined.

In the cord counting method of according to the present invention, it is possible to use a plurality of displacement sensors 7. In the step S1 in this case, the raw waveform data D1 is obtained from each displacement sensor 7.

In each of the steps S2, S3, the first and second corrected data D2 and D3 are obtained from each set of the raw waveform data D1.

In the step S4, the concave-center-position data D4 is obtained from each set of the second corrected data D3, and then the sets of the concave-center-position data D4 are averaged while superimposing the respective concave-center-positions Q. Thus, one set of the averaged concave-center-position data D4 is obtained.

Then, using the concave-center-positions Q of the averaged concave-center-position data D4, the subsequent steps S5, S6 are performed.

While detailed description has been made of an especially preferable embodiment of the present invention, the present invention can be embodied in various modes without being limited to the illustrated embodiment.

DESCRIPTION OF SYMBOLS 2 rubber sheet
2s outer surface
3 cord
5 protrusion
6 recess
7 displacement sensor
11 valley
11b lowest point
D1 raw waveform data
D2 first corrected data
D3 second corrected data
D4 concave-center-position data
D5 first corrected concave-center-position data
D6 second corrected concave-center-position data
E1 one end
j amplitude center
P average pitch distance
Q concave-center-position
S1-S6 step

The invention claimed is:

1. A cord counting method for counting a number of cords from one end in a widthwise direction of a rubber sheet, in which a number (n) of the cords are embedded at intervals, and in an outer surface of the rubber sheet, convex portions at which the cords are located and concave portions positioned between the cords are alternately repeated,
said cord counting method comprising:
1) a step (S1) in which, by use of a displacement sensor, the outer surface of the rubber sheet is scanned in the widthwise direction, and raw waveform data on convexoconcave of the outer surface is acquired,
2) a step (S2) in which a moving average processing is carried out on the raw waveform data so as to reduce noise, whereby first corrected data of a smoothed waveform is obtained from the raw waveform data,
3) a step (S3) in which second corrected data is obtained from the first corrected data by converting an amplitude center (j) of the waveform of the first corrected data into a straight line,
4) a step (S4) in which widthwise-direction concave-center-position data is obtained wherein concave-center-positions in the widthwise direction between the cords are defined by positions of lowest points of valleys of the waveform of the second corrected data,
5) a step (S5) in which, with respect to said concave-center-position data, intervals K between the concave-center-positions adjacent in the widthwise direction are sequentially compared with a predetermined upper interval threshold K max, and
if K>K max, then a concave-center-position for correction is added at a midpoint of an interval K, and
said intervals K are sequentially compared with a predetermined lower interval threshold K min, and if K<K min, then from the concave-center-positions on both sides of the interval K, the concave-center-position on a front side in a scanning direction is removed,
whereby first corrected concave-center-position data is obtained,
6) a step (S6) in which, with respect to the first corrected concave-center-position data, a total number (m) of the concave-center-positions is compared with said number (n), and when m<(n−1), in order from a largest interval K, a concave-center-position for correction is added at the midpoint of the interval K, until becoming m=(n−1),
when m>(n−1), from the concave-center-positions on both sides of the interval K, the concave-center-position on the front side in the scanning direction is deleted in order from a smallest interval K, until becoming m=(n−1), whereby second corrected concave-center-position data is obtained, and 7) count from one end in the widthwise direction, of the concave-center-positions in said second corrected concave-center-position data is considered as the number of the cords from said one end in the widthwise direction.

2. The method for counting cords in a rubber sheet as set forth in claim 1, wherein the moving average processing in the step (S2) is carried out in a range of 20-30% of an average pitch distance of said cords.

3. The method for counting cords in a rubber sheet as set forth in claim 2, wherein, in the step (S5), the upper interval threshold K max is in a range of 120-150% of an average pitch distance of said cords, and the lower interval threshold K min is in a range of 50-80% of the average pitch distance of said cords.

4. The method for counting cords in a rubber sheet as set forth in claim 1, wherein, in the step (S5), the upper interval threshold K max is in a range of 120-150% of an average pitch distance of said cords, and the lower interval threshold K min is in a range of 50-80% of the average pitch distance of said cords.

* * * * *